United States Patent [19]

Lazaridis

[11] Patent Number: 5,657,345
[45] Date of Patent: Aug. 12, 1997

[54] COMPUTER SYSTEM FOR USE WITH A WIRELESS DATA COMMUNICATION NETWORK

[75] Inventor: Mihal Lazaridis, Waterloo, Canada

[73] Assignee: Research In Motion Limited, Waterloo, Canada

[21] Appl. No.: 474,543

[22] Filed: Jun. 7, 1995

Related U.S. Application Data

[63] Continuation of Ser. No. 114,873, Aug. 31, 1993, abandoned.

[51] Int. Cl.[6] .................................................. H04B 1/38
[52] U.S. Cl. .................... 375/222; 375/220; 379/93.17
[58] Field of Search ........................... 375/220, 222, 375/377; 379/93, 94, 96

[56] References Cited

U.S. PATENT DOCUMENTS

| Re. 34,034 | 8/1992 | O'Sullivan | 379/58 |
|---|---|---|---|
| 3,869,577 | 3/1975 | Couturier et al. | 375/222 |
| 3,894,287 | 7/1975 | Mathiesen | 375/222 |
| 4,776,005 | 10/1988 | Petriccione et al. | 379/142 |
| 4,852,122 | 7/1989 | Nelson et al. | 375/222 |
| 5,050,205 | 9/1991 | Kelly et al. | 379/93 |
| 5,144,651 | 9/1992 | Cooper | 379/98 |
| 5,239,385 | 8/1993 | Ejiri | 358/434 |
| 5,241,565 | 8/1993 | Kloc et al. | 375/285 |
| 5,396,536 | 3/1995 | Yudkowsky | 379/93 X |

FOREIGN PATENT DOCUMENTS

| 0047833 | 3/1982 | European Pat. Off. . |
|---|---|---|
| 9003076 | 3/1990 | WIPO . |
| 9107044 | 5/1991 | WIPO . |
| 9210047 | 6/1992 | WIPO . |
| 9506997 | 3/1995 | WIPO . |

*Primary Examiner*—Young T. Tse
*Attorney, Agent, or Firm*—Jones, Day, Reavis & Pogue; Charles B. Meyer

[57] ABSTRACT

The present invention provides a method for enhancing service signals transmitted by a DCE, such as a Modem, to a DTE user. Since any transmission from a remote computer to a DTE user through a wireless communication network can be encoded with additional information, use of an AT compatible modem in conjunction with a wireless communication network adds a new dimension of information that can be displayed to the DTE user. The present invention also includes a method for ensuring effective data transfer from a DCE to a DTE user. When a DTE receives a connection service signal it will often require several internal adjustments before it can accept data. Because data received by a radio-based modem is received in packets, under certain conditions data will be waiting to be transmitted to the user immediately after the modem enters a data transfer state. The method of this invention includes the steps of transmitting a service signal to the DTE indicating that the modem has entered a data transfer state and delaying for a predetermined time after transmitting the data-transfer-state signal before transmitting data from the modem to the DTE.

31 Claims, 6 Drawing Sheets

COMPUTER SYSTEM FOR USE WITH A WIRELESS DATA COMMUNICATION NETWORK

This is a continuation of application Ser. No. 08/114,873 filed on Aug. 31, 1993, now abandoned.

BACKGROUND OF THE INVENTION

This invention relates generally to the art of connecting data terminal equipment (DTE) users to remote computer systems (or hosts) through a wireless or radio wave data communication network. The invention disclosed may, however, be useful for other forms of data transmission and communication systems.

Over the past several decades, various communication networks have evolved to meet the growing need for access to information. Among the more familiar types of systems used for communication are wire-based telephone communication systems that use physical wires or optical fiber links to connect users. Data transmission using wire-based telephone communication systems can be accomplished using existing AT Modem technology. An AT Modem is a standard data communication equipment (DCE) connection device used with telephone equipment for converting or modulating an asynchronous stream of data into a phone line carrier signal. The connection between an AT Modem and a DTE, such as a personal computer or a portable computer, is usually through an RS-232 interface. One of the principal disadvantages of a wire-based telephone communication network is that users are limited to specific locations where wired connections are available. Another disadvantage is that wire-based telephone communication networks usually require dedicated telephone lines, which can be expensive.

Recently wireless data communication networks have emerged that enables information exchange by sending and receiving data through high frequency radio signals. Examples of such networks include the Mobitex Radio Network (Mobitex), which is operated by RAM Mobile Data, and Ardis, which is a joint venture of Motorola and IBM. Mobitex was developed in Sweden by Ericsson/Eritel and has been installed and is maintained in many other countries. For example, in Canada, Mobitex is operated by Roger's Cantel. Making efficient use of these wireless data communication networks to connect DTE users to remote computer systems is one of the objects of this invention.

Electronic data communication is organized into networks that have established protocols and specifications. Communication between computers takes place over a connection that is established using a common protocol. A data communication network generally refers to a collection or grouping of computers organized for co-operative communication of data. Once a connection is established, there are a number of data transfer methods used by various data communication networks. Both Mobitex and Ardis use packet switched data transfer methods, which aggregate data into blocks called packets before it is transmitted.

Ericsson also manufactures a device called a Mobidem, which is a radio based modem that is capable of transmitting digital information across the Mobitex data communication network. A Mobidem essentially provides an interface between a DTE user and Mobitex. Unfortunately, effective communication between a DTE user and a remote computer system across a wireless communication network, such as Mobitex, requires significant enhancements to support the standard AT Modem protocol. An object of this invention is to provide an enhanced user interface to a wireless data communication network such as Mobitex that is compatible with standard AT Modem technology.

A standard AT compatible modem is capable of sending a number of service signals to its DTE user that indicate changes in the status of the modem. For example, if the user makes a call to a remote computer system, several possible events may occur that result in associated service signals:

- if the modem is disconnected, the message "No Carrier" will be displayed;
- if a connection is made, the message "Connect 2400" will be displayed; and
- if the call is made and the remote computer does not answer, "Busy" or "No Answer" will be displayed.

These messages can handle all of the events that can occur in the operation of a land-line modem (i.e. one that uses telephone lines).

The user of the modem has the option of setting various AT Modem parameters that affect whether service signals are transmitted by the modem to the DTE and the form in which they are transmitted. If the user enables the modem to transmit text service signals, the messages noted above will be transmitted to the DTE for display. If the user enables the modem to transmit numeric messages, the modem will transmit a numeric code to the DTE that corresponds to the event that occurred. If user does not enable the modem to transmit service signals, service signals will not be transmitted to the DTE.

Since any transmission from a remote computer to a DTE user through a wireless communication network such as Mobitex can be encoded with additional information, use of an AT compatible modem in conjunction with Mobitex adds a new dimension of information that can be displayed when an event occurs. An object of this invention is to enhance an AT compatible modem to transmit service signals that include information such as the identity of the caller and a presentation string.

All AT Modems have two basic states of operation; a command state and a data transfer state. In the command state, the DTE user can send command signals to the modem and change the modem's operating parameters. At start-up, an AT Modem is in the command state. When a connection is established, an AT Modem automatically shifts to the data transfer state. Because data received by a radio-based modem such as a Mobidem is received in packets, under certain conditions data will be waiting to be transmitted to the user immediately after the modem enters the data transfer state. Unfortunately, many DTE user applications will fail if the modem begins transmitting data to the user immediately after the modem transmits an entering-data-transfer-state signal. Another object of this invention is to provide a method for delaying data transmission by the modem to the user for a period of time after the modem has entered a data transfer state.

SUMMARY OF THE INVENTION

The preferred system configuration of the present invention includes use of data terminal equipment (DTE), such as a portable computer, together with data communication equipment (DCE), such as the Mobidem manufactured by Ericsson to communicate with a remote computer system or network. Data transmission between the DTE and the DCE consists of a serial data stream. Preferably, the connection between the DTE and the DCE is RS-232 compatible. The DCE processes the data received from the DTE user, bundles the data into packets and transmits the data packets through a wireless communication network such as Mobitex to a gateway. The gateway receives the data transmitted by the DCE and processes that data so that it is compatible with the X.25 standard for packet network interfaces and can be transmitted to any remote computer system or network as long as that system is X.25 compatible. (Although the preferred system configuration incorporates a gateway that is X.25 compatible, the gateway may be configured so that it is compatible with any standardized protocol.)

In a similar fashion, using the preferred system configuration, any remote computer system that is X.25 compatible can transmit information to a DTE user. The remote computer transmits the information in X.25 data packets to the gateway, which disassembles the X.25 data packets and reassembles the data into packets suitable for transmission through a wireless communication network such as Mobitex. The DCE receives the information transmitted through the wireless communication network and processes that information so that it can be transmitted in a serial data stream to the DTE user.

The present invention provides a method for enhancing service signals transmitted by a DCE, such as a Mobidem, to a DTE user. Since any transmission from a remote computer to a DTE user through a wireless communication network such as Mobitex can be encoded with additional information, use of an AT compatible modem in conjunction with a wireless communication network adds a new dimension of information that can be displayed to the DTE user. The method of the present invention includes the steps of the DCE device receiving a modulated signal from a communication network that includes information such as the source of the signal and may include message data. As noted above, data is transmitted through a wireless communication network such as Mobitex in a data packet that must be disassembled by the DCE for transmission to the DTE user in a serial data stream. The DCE processes the information included in the data packet and, depending on the mode of operation selected by the DTE user, transmits a service signal to the DTE that indicates the source of the data packet and any message data included in that data packet, which is displayed by the DTE to the user.

The method of the present invention uses an AT compatible modem, which includes a receiver for receiving a data packet transmitted through a wireless communication network such as Mobitex. The modem also includes a microcomputer coupled to the receiver for disassembling the data packet and configuring the data into a serial data stream, which, depending on the mode selected by the DTE user, includes information indicating the source of the data packet and message data, for transmission to the DTE user. As noted above, the connection between the modem and the DTE is preferably an RS-232 interface. The microcomputer is coupled to the RS-232 connection for transmitting the serial data stream to the DTE user. The DTE includes a display for displaying source and message data to the DTE user.

The present invention also includes a method for ensuring effective data transfer from a DCE to a DTE user. When a DTE receives a connection service signal it will often require several internal adjustments before it can accept data. These adjustments may require some amount of time. Because data received by a radio-based modem such as a Mobidem is received in packets, under certain conditions data will be waiting to be transmitted to the user immediately after the modem enters a data transfer state. The method of this invention includes the steps of transmitting a service signal to the DTE indicating that the modem has entered a data transfer state and delaying for a predetermined time after transmitting the data-transfer-state signal before transmitting data from the modem to the DTE. This procedure provides a delay between transmission of a connection service signal and transmission of data by the DCE to allow the DTE sufficient time to make any internal adjustments that may be necessary before it can accept data.

BRIEF DESCRIPTION OF THE DRAWINGS

The novel and useful features of the invention are set forth in the claims. The invention itself, however, as well as specific features and advantages of the invention may be best understood by reference to the detailed description that follows, when read in conjunction with the accompanying drawings.

DESCRIPTION OF THE PREFERRED EMBODIMENT

Figure 1:
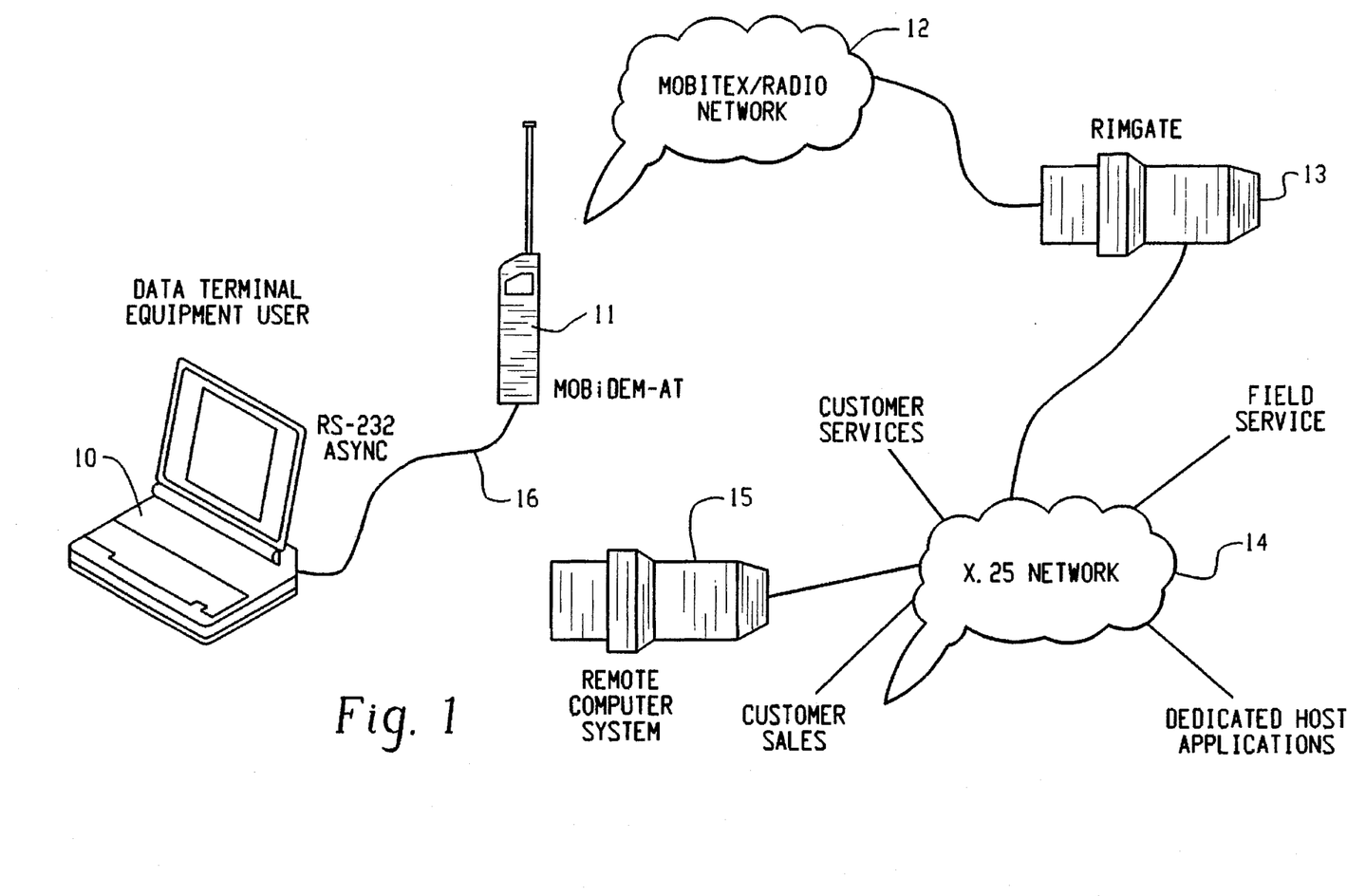
FIG. 1 is a block diagram that illustrates a typical connection between a DTE user and a remote computer system through a wireless data communication network.

FIG. 1 shows the preferred system configuration for use of the present invention. A typical system consists of a DTE 10, such as portable computer, a modem 11 suitable for use with a wireless communication network such as Mobitex Radio Network 12, a gateway 13, for communication between Mobitex 12 and an X.25 network 14, and a remote computer system 15 connected to X.25 network 14. Alternatively, gateway 13 may be connected directly to remote computer system 15, since both are X.25 compatible. In the preferred embodiment modem 11 is a Mobidem, but may be any radio based modem that is capable of transmitting digital information across a wireless data communication network such as Mobitex 12. DTE 10 is physically connected to modem 11 by a standard RS-232 cable 16, which is suitable for bi-directional transmission of serial data. Mobitex 12 is connected to gateway 13 by a leased line, and gateway 13 is connected to X.25 Network 14 by a synchronous modem (not shown). Also, in the preferred embodiment, gateway 13 is a RIMGATE available from Research In Motion of Waterloo, Canada.

The system configuration illustrated in FIG. 1 allows the DTE user to communicate effectively with remote computer system 15. Information is transmitted from DTE 10 to Mobidem 11 as an asynchronous stream of data. Mobidem 11 receives this data, processes it and assembles it into Mobitex data packets (MPAKs), which are suitable for transmission through Mobitex 12. Mobitex 12 receives the MPAKs transmitted by Mobidem 11 and relays those MPAKs to gateway 13. Gateway 13 disassembles the MPAKs and reassembles the data into X.25 data packets that can either be transmitted through X.25 network 14 to remote computer system 15 or, if there is a direct connection between the gateway 13 and the remote computer system 15, transmitted directly to remote computer system 15.

In a similar fashion, remote computer system 15 can transmit information to DTE 10. Remote computer system 15 transmits X.25 data packets to gateway 13, where they are disassembled and reassembled into MPAKs that are transmitted through Mobitex 12 to Mobidem 11. Mobidem 11 disassembles the MPAKs and transmits the data to DTE 10 as a serial asynchronous data stream.

In FIG. 1, gateway 13 acts as an intermediate node between Mobilex 12 and X.25 Network 14. Instead of connecting to a remote computer system, a DTE user may communicate with another DTE user by designating that data packets be routed to another Mobidem (not shown). In this way a DTE user can communicate directly with another DTE user through Mobitex 12.

AT Modems have two basic states of operation; a command state and a data transfer state. In the command state, the DTE user can send command signals to modem 11 to set various modem operating parameters and store these parameters in memory. The DTE user sets these parameters by sending control signals across RS-232 cable 16 to modem 11. These parameters may be stored in a memory device, such as an electrically alterable ROM, so that the user's selected operating parameters are not lost if modem 11 is turned off and back on.

One of the operating parameters that can be set by the user of a conventional AT modem is whether service signals are transmitted to the DTE. A service signal is a simple message that informs the DTE user that the modem has changed state. For example, when a standard AT Modem receives a connection request, it generates a service signal that causes the DTE to display the message "RING". Any transmission routed though a wireless communication network such as Mobitex 12, however, includes certain routing information and can be encoded with additional information that can be used to enhance service signals transmitted to the DTE for display. In accordance with the present invention, the user also has the ability to enable verbose message mode (#V1) and extended verbose message mode (#V2). #V1 and #V2 cause additional information to be included with the service signal displayed to the DTE user. #V1 causes the Mobitex Access Number (MAN) of the calling device to be displayed with the service signal and #V2 causes the MAN number and a presentation string to be displayed with the service signal.

Figure 2:
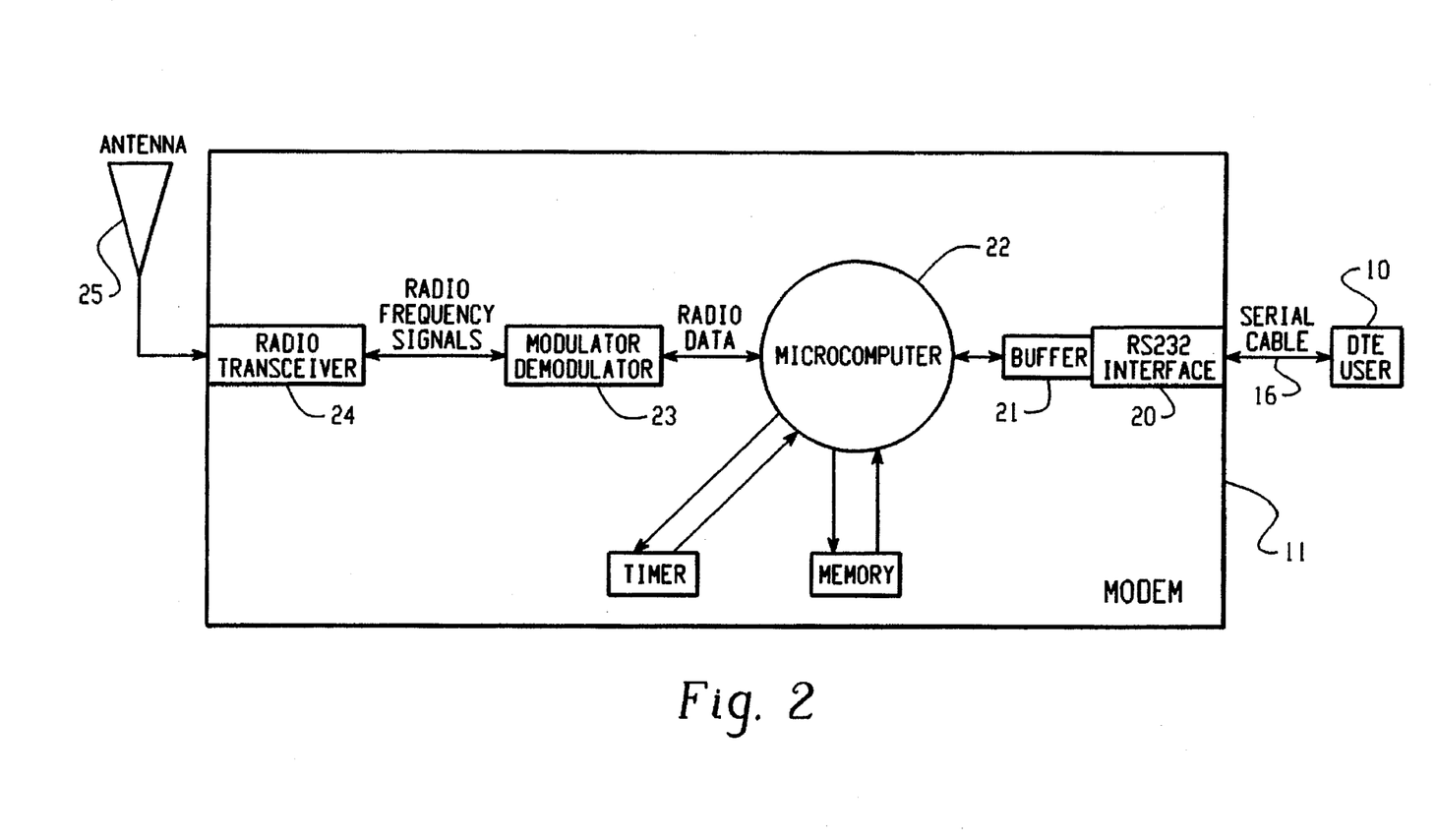
FIG. 2 is a general block diagram of the basic hardware components of a modem suitable for use with a wireless communication network.

FIG. 2 is a general block diagram of modem 11, which is suitable for use with a wireless communication network such as Mobitex 12. As noted above, in the preferred modem 11 for use in accordance with this invention is a Mobidem and DTE 10 is physically connected to Modem 11 by a standard RS-232 cable 16, which is suitable for bi-directional transmission of serial data. This connection to modem 11 is made through a standard RS-232 interface 20. RS-232 interface 20 accepts control signals and serial data transmitted from DTE 10 and relays that information to microcomputer 22 through buffer 21. Buffer 21 stores information received from RS-232 interface 20 until microcomputer 22 is ready to accept it. Buffer 21 also stores information received from microcomputer 22, which is transmitted to DTE 10 through RS-232 interface 20 when DTE 10 is ready to accept it. Microcomputer 22 contains the logic circuitry and memory required to implement the invention. Microcomputer 22 takes serial data received from buffer 21 and assembles that data into MPAKs for transmission through Mobitex 12. Microcomputer 22 also disassembles MPAKs received from Mobitex 12 and configures that data into a serial data stream for transmission to DTE 10.

Information that has been assembled into MPAKs for transmission through Mobitex 12 is first modulated by modulator/demodulator 23 and then forwarded to radio transceiver 24. From radio transceiver 24, information is transmitted to Mobitex 12 through antenna 25. Transceiver 24 also receives modulated signals through antenna 25 that include information in MPAKs from Mobitex 12. These signals are demodulated by modulator/demodulator 23 and forwarded to microcomputer 22. As noted above, microcomputer 22 disassembles MPAKs received from Mobitex 12 and configures that data into a serial data stream for transmission to DTE 10. Microcomputer 22 also examines these signals for validity and content.

Figure 3:
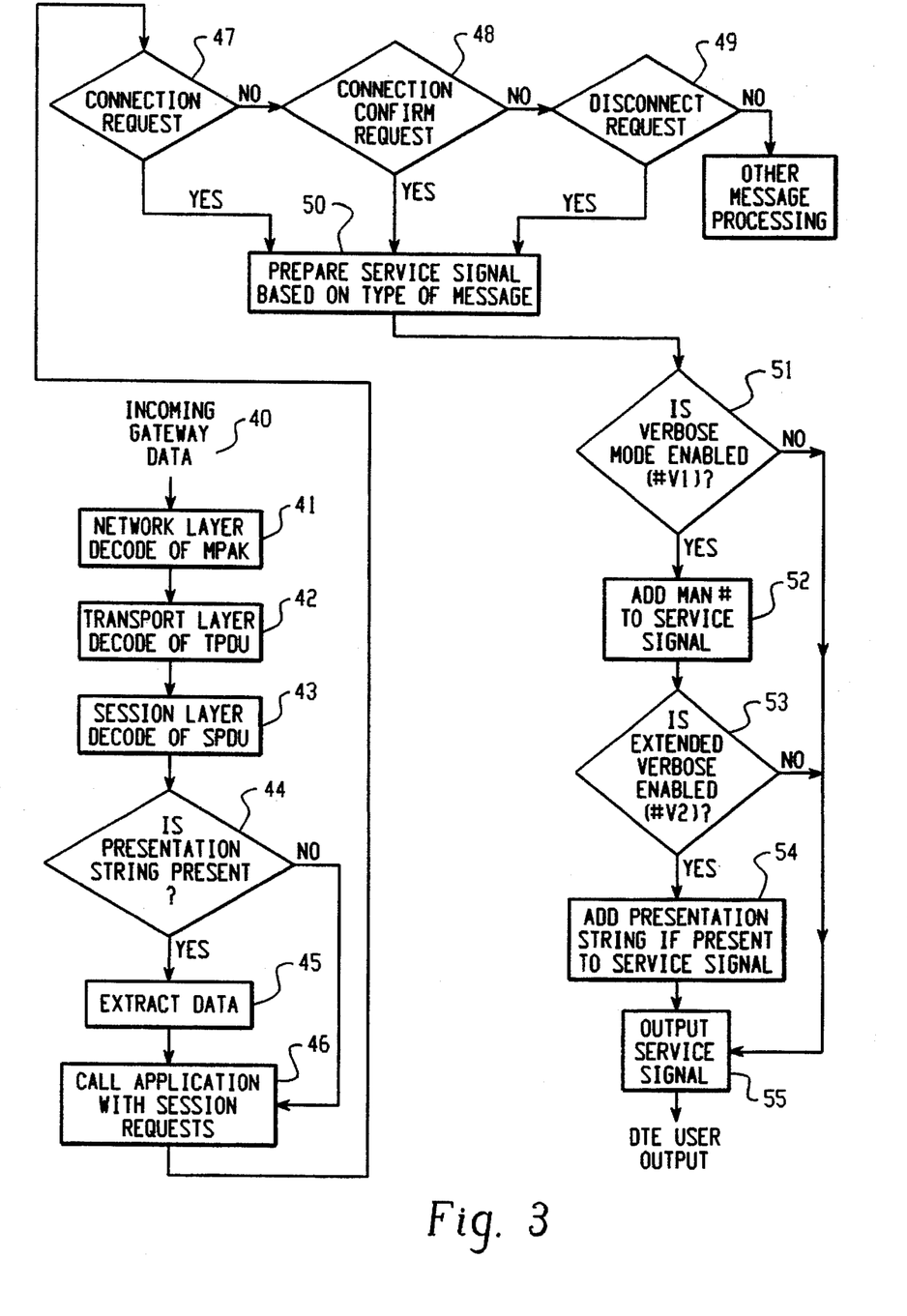
FIG. 3 is a block diagram showing the protocol layers involved in establishing and maintaining a connection between a DTE user and a remote computer system through a wireless communication network.

Operation of Mobidem 11 in connection with gateway 13, or in connection with another Mobidem involves several protocol layers. FIG. 3 is a detailed illustration of the various protocol layers involved in supporting an end-to-end connection between Mobidem 11 and gateway 13 or another Mobidem. These layers work together as defined by the International Standard's Committee (ISO's) paper on Open System Interconnect (OSI). Each protocol layer has its own distinct header that enables it to perform its specific protocol functions. The exact format of each protocol, the service definition between the different layers and the function of each protocol is set forth in a series of documents available from Ericsson Sweden and Eritel Sweden including:

a. Mobitex Terminal Specification 001 53-03/L2BA 703 1001 Section: Mobitex Network Layers for Terminals S/1056-A-296 S171/0 Ue Eritel AB, Sweden
 b. Mobitex Transport Protocol, Release B (MTP/1) Y/KL-91:754 1/1155 17-CALA 88215 By: Anders Olsson and Eddie Johansson Ericsson Mobile Communications AB
 c. Mobitex Transport Service Definition AUR-92:760 By: Anders Olsson Ericsson Mobile Communications AB
 d. MCP/1 Mobitex Compression Protocol ECS Y/G-93:0242 By: Jack De Winter Research In Motion, Waterloo, Canada and Ericsson AB, Sweden
 e. MCP/1 Mobitex Compression Service Definition ECS Y/G-93:0241 By: Jack De Winter Research In Motion, Waterloo, Canada and Ericsson AB, Sweden As shown in FIG. 3, adjacent layers make use of lower layers for services. The application on both sides of the Mobitex connection makes use of the session interface to access a range of session services. Examples of these services include: Session Open (Accept) Connection, Session Close Connection and Session Send Data. The function of these services include opening a session, closing a session and sending data through a session. Each of these services is completely defined by the MCP/1 specifications referenced above.

The Session layer makes use of the transport interface to access a range of transport services, including, Transport Open Connection, Transport Close Connection and Transport Send Data. The function of these services is to open a transport connection, close a transport connection and send data through a transport connection. Each of these services is completely defined by the MTP/1 specifications referenced above. The transport layer interfaces with the network layer and makes use of the network layer for services. The object of the transport layer is to guarantee the delivery of data.

The transport layer makes use of the Network layer for network services. The basic function of the Network layer is to build and interpret MPAKs. The radio protocol layers implement ROSI and GMSK, which perform the modulation/demodulation required to convert data into the RF format used by Mobitex. ROSI is a method used to place data into small packets for transmission. GMSK stands for Gauss Mean Shift Keying and is simply a modulation technique used for modulating FM data on a radio signal.

Establishing and maintaining a connection between Mobidem 11 and gateway 13 through Mobitex 12 involves each of the protocols shown in FIG. 3. For example, as data arrives into Mobidem 11 from Mobitex 12, it is passed through Radio layers 30 to the Network layer 31. Data arrives at Network layer 31 in MPAKs, where is checked to make sure that data has arrived in the correct format and then passed to Transport layer 32. The MTP/1-based Transport layer 32 looks at the MTP/1 message type, found in the first three bytes of the message, also called the message header, to determine how to process the MTP/1 message. Protocol messages exchanged between different Transport layers are called Transport Protocol Data Units (TPDUs) and follow the format documented in the MTP/1 specification referenced above. After Transport layer 32 has decoded the TPDU, it passes the message up to Session layer 33 as a session message. Protocol messages exchanged between different Session layers are called Session Protocol Data Units (SPDUs) and follow the format documented in the MCP/1 specification referenced above. Session layer 33 interfaces with Application 34.

Figure 4:
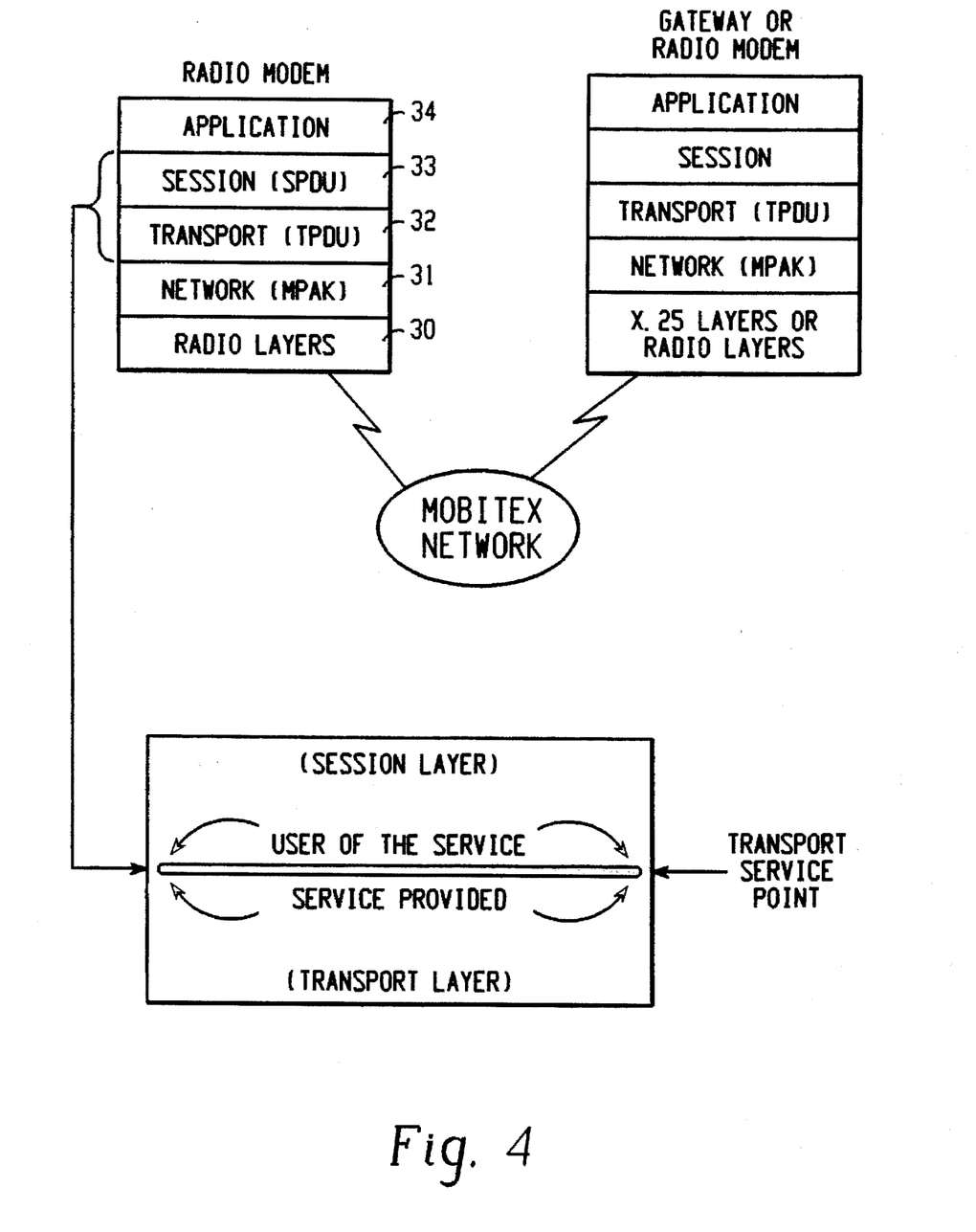
FIG. 4 is a state diagram that illustrates the preferred method of enhancing service signals transmitted by a modem to a data terminal equipment user, to include information such as the source of the signal received by the modem and a presentation string.

FIG. 4 is a state diagram that illustrates the preferred method of enhancing service signals transmitted by a modem to a DTE user. For example, to establish a connection with Mobidem 11, gateway 13 sends an MPAK through Mobitex 12 that includes a connection request. Each MPAK includes a source and destination Mobitex Access Number (MAN) that is used by Mobitex for routing and billing purposes. As noted above, as data arrives into Mobidem 11 from Mobitex 12, it is passed through the Radio layers to the Network layer 31, functionally represented by block 41. At network layer, when Mobidem 11 receives a valid MPAK, it takes out the MAN number and hands this information along with any data present in the MPAK to Transport layer 32, functionally represented by block 42. The transport layer, interprets the TPDU, to determine how to process it. If the TPDU is a connection request (CR), Transport layer 32 opens a transport connection and marks it as 'opening' and passes the CR to Session layer 33. If the TPDU is a connection confirmation (CC), Transport layer 32 looks for a transport connection that is in the 'opening' state, marks it as 'opened' and passes the CC message to Session layer 33. If the TPDU is a disconnect request (DR) it looks for a transport connection that is in the 'opened' state or the 'opening' state, removes the connection from the list of open connections, and passes the DR up to Session layer 33. (The MTP/1 specification referenced above lists other messages that may be encountered by the transport layer.) Transport layer 32 also converts the MAN numbers received from Network layer 31 into Transport Service Access Points (TSAPs), which are also passed up to Session layer 33. A TSAP is simply the MAN numbers with a 4 bit identification code attached. Defined in the MTP/1 specification. The message, TSAP and any other data received from Network layer 32 is passed up to the session layer as a Session SPDU, block 43.

Session layer 33, examines the SPDU received from Transport layer 32 to determine the content of the SPDU and to check to see if a presentation string is present, block 44. If a presentation string is present, the session layer extracts the presentation string from the SPDU, block 45. The SPDU from the transport layer should match the current state of the session layer. If the SPDU is a CR, the session layer 33 checks to see if a connection with the same TSAP exists and if not opens the connection. If the SPDU is a CC or a DR, the session layer scans its list of connections for a connection already open to the same TSAP. Once the session layer has performed its tests and verified the SPDU, it converts the TSAP to a Session Service Access Point (SSAP) as required by the MCP/1 specification referenced above. The SPDU, presentation string and SSAP are then passed to the Application 34 as a Session Request, block 46.

After Application 34 receives the Session Request, it determines whether it is a valid request as illustrated by blocks 47–49. At block 47, if the Session Request is a CR, the application checks to ensure that a connection is not already opened or pending; At block 48, if the Session Request is a CC, the application verifies that it has made a CR. At block 49, if the Session Request is a DR, the application verifies that a full connection is currently open. When a match is reached, the application determines the type of service signal that will be transmitted to the DTE user, block 50.

Before the service signal is sent to the DTE user, the application checks to determine whether the user has selected verbose message mode and extended verbose message mode. If the setting #V1 is detected, block 51, the MAN number of the calling device is included with the standard service signal, block 52. Application 34 extracts the calling MAN number from the SSAP by deleting the four bit identification code and using the MAN number from the SSAP data structure that corresponds to the calling device. If the setting #V2 is detected, the presentation string is added to the service signal and the MAN number, block 53. Finally the application sends the enhanced service signal to the DTE user over RS-232 interface, block 54.

Figure 5:
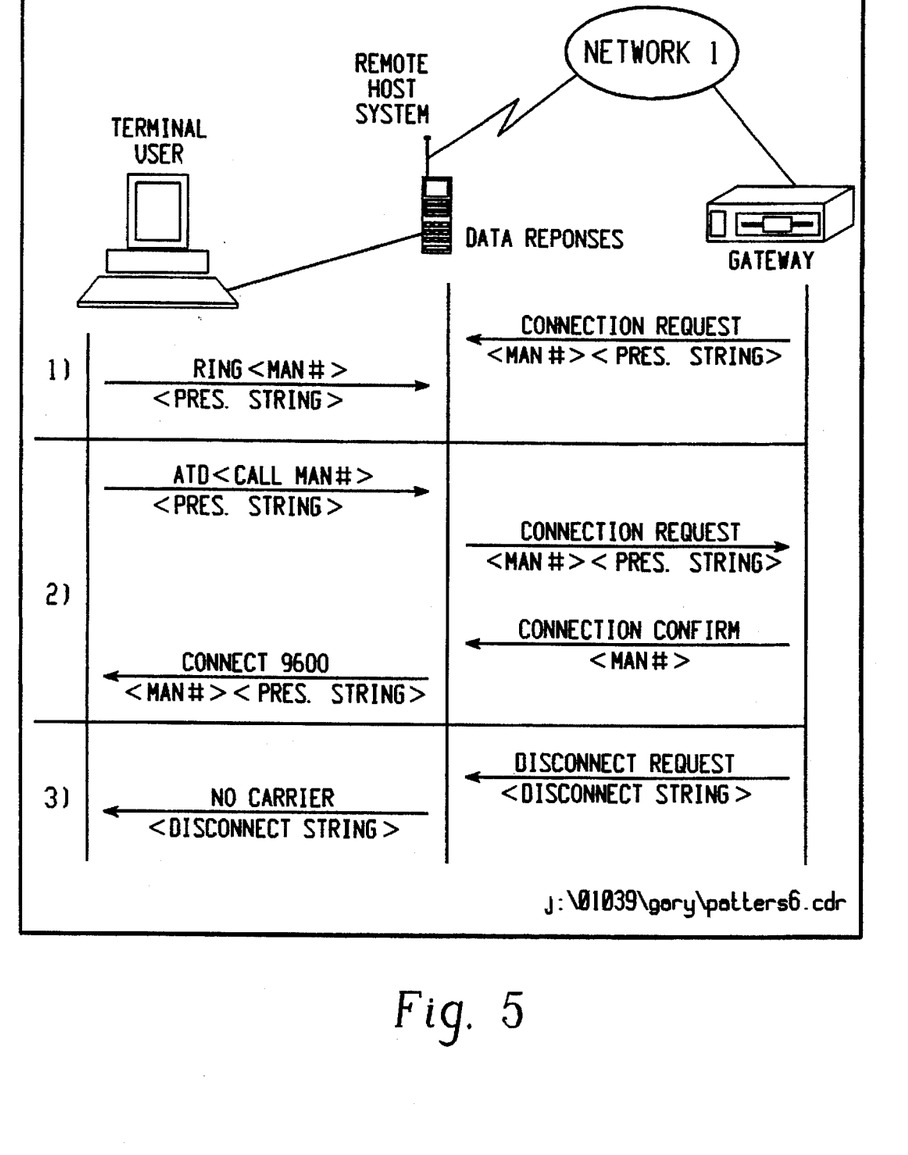
FIG. 5 is a block diagram that shows three examples of enhanced service signals.

FIG. 5 is a block diagram that shows three examples enhanced service signals. Example 1 is an illustration of gateway 13 accessing modem 11, which is essentially the same as the example discussed in connection with FIG. 3.

In example 2, the DTE user requested a connection to a given MAN using a standard AT Modem Dial command. As noted above, a full connection sequence, as defined by MTP/1 and MCP/1 is a two step process. It involves a CR followed by a CC. These are symmetrical messages and they contain same information as for the application is concerned. Therefore it is possible to include a presentation string on the CR and the CC messages that are exchanged between the session and application layers. When a connection is accepted, a CC returns from the gateway. In the example, if the DTE user has enabled extended verbose messages, the standard service signal "Connect 9600" will be extended to include the MAN number of the gateway and a presentation string if provided by the gateway.

In example 3, the gateway has initiated a disconnect and included a disconnect string. A disconnect could occur if the remote computer system abruptly disconnected the DTE user, of the CR failed. If the DTE user has enabled extended verbose messages, the DTE user can see the disconnect string attached to the standard service signal "No Carrier".

Figure 6:
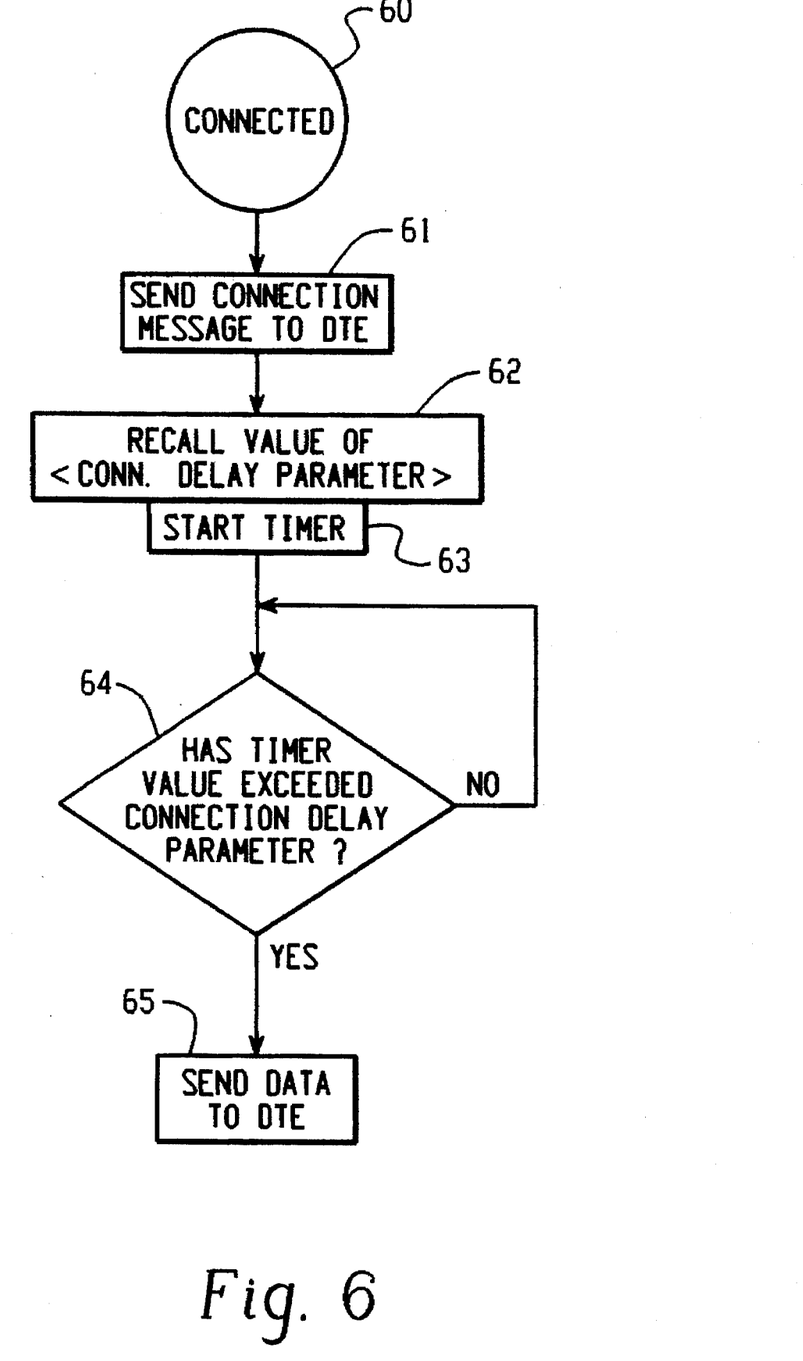
FIG. 6 is a block diagram showing the structure of the logic design of the preferred method of introducing a connection delay parameter that delays transmission of data from the modem to the terminal equipment user for a predetermined time after transmission by the modem of a connection confirmation message.

FIG. 6 is a block diagram that illustrates the structure of the logic design of the preferred method of introducing a connection delay parameter that delays transmission of data from modem 11 to DTE 10 for a predetermined time after transmission by modem 11 of a connection confirmation signal. The logic conceptually begins at block 60 when a connection is established between modem 11 and remote computer system 15. When modem 11 receives a connection confirmation signal from remote computer system 15 it enters a connected state 60 and then proceeds to block 61, where it generates a service signal that notifies DTE 10 that a connection has been established. After sending the connection service signal, modem 11 proceeds to block 62, which recalls the value of the connection delay parameter selected by the user, and then to block 63, which initiates a timer. Block 64 compares the value of the timer to the value of the connection delay parameter. When the value of the timer exceeds the value of the connection delay parameter, modem 11 drops down to block 65 and begins sending data to DTE 10. This procedure provides a delay between transmission of a connection service signal and transmission of data by DCE 11 to allow DTE 10 sufficient time to make any internal adjustments that may be necessary to accept data from DCE 11. The preferred embodiment also provides a mechanism to allow the DTE user to set the duration of the delay to accommodate various DTE equipment and configurations.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

The invention claimed is:

1. A method of indicating to data terminal equipment (DTE) a source of data transmitted over a data communications network and through a gateway to data communications equipment (DCE) that is configurable to receive such data from the gateway and is connected to the DTE, the method comprising the steps of:

(a) preparing a session request from a request initiator that is to be transmitted via the data communications network through the gateway to the DCE, wherein the session request includes identification data that identifies the source of the session request;

(b) transmitting the session request over the network through the gateway to the DCE;

(c) determining whether the session request is valid;

(d) if the session request is valid, preparing a service signal from the DCE to the DTE in response to the session request;

(e) enhancing the service signal by adding an identifier that represents at least a part of the identification data to the service signal;

(f) transmitting the service signal that has been enhanced in the enhancing step to the DTE; and (g) processing the service signal at the DTE.

2. The method of claim 1, wherein the session request includes a presentation string.

3. The method of claim 2, wherein the processing step (g) includes a step of displaying a message based upon the presentation string.

4. The method of claim 2, including, prior to the processing step (g), the step of setting a DCE parameter to indicate whether a message based upon the presentation string is to be displayed.

5. The method of claim 4, wherein the processing step (g) includes a step of displaying the message.

6. The method of claim 4, wherein the processing step (g) includes the step of assessing the DCE parameter to determine whether the message based upon the presentation string is to be displayed.

7. The method of claim 1, wherein the DCE is a modem.

8. The method of claim 1, wherein the processing step (g) includes a step of displaying an indication, based upon the identifier, of the source of the session request.

9. The method of claim 1, including, prior to the processing step (g), the step of setting a DCE parameter to indicate whether an indication of the source of the session request is to be displayed.

10. The method of claim 9, wherein the processing step (g) includes a step of displaying the indication.

11. The method of claim 9, wherein the processing step (g) includes the step of assessing the DCE parameter to determine whether the indication of the source of the session request is to be displayed.

12. The method of claim 1, wherein the session request is a connection request.

13. The method of claim 1, wherein the session request is a connection confirm request.

14. The method of claim 1, wherein the session request is a disconnect request.

15. The method of claim 1, wherein the data communications network is a wireless data communications network.

16. A method of enhancing a data communication service signal that is communicated over a data communications network and through a gateway to data communications equipment (DCE) that is configurable to receive such data from the gateway and is connected to data terminal equipment (DTE), the method comprising the steps of:

(a) preparing a session request from a request initiator that is to be transmitted via the data communications network through the gateway to the DCE, wherein the session request includes a presentation string;

(b) transmitting the session request over the network through the gateway to DCE;

(c) determining whether the session request is valid;

(d) if the session request is valid, preparing a service signal from the DCE to the DTE in response to the session request;

(e) determining whether the service signal should be enhanced, and if the service signal is to be enhanced, adding a message to the service signal based upon the presentation string;

(f) transmitting the service signal to the DTE; and (g) processing the service signal at the DTE.

17. The method of claim 16, wherein the session request includes identification data that identifies the source of the session request.

18. The method of claim 16, wherein the DCE is a modem.

19. The method of claim 17, wherein the processing step (g) includes a step of displaying an indication, based upon the identification data, of the source of the session request.

20. The method of claim 16, wherein the processing step (g) includes a step of displaying a message based upon the presentation string if the processing string is present.

21. A system for enhancing service signals that are transmitted between a modem and data terminal equipment (DTE) associated with the modem by providing to the DTE an indication of the source of data transmitted over a data communications network and through a gateway to the modem, the system including:

means for detecting a session request from a request initiator that is transmitted via the data communications network through the gateway to the modem, wherein the session request includes identification data that identify the source of the session request;

validating means for determining whether the session request is valid;

means for preparing a service signal from the modem to the DTE in response to the session request and in response to the determination made by the validating means;

means for enhancing the service signal by adding an identifier that represents at least a part of the identification data to the service signal;

means for transmitting the service signal to the DTE; and means for processing the service signal at the DTE.

22. The system of claim 21, wherein the means for processing includes means for determining whether a representation based upon the identifier is to be displayed.

23. Data Communications Equipment (DCE) for receiving a session request from a data communications network via a gateway and for transmitting the session request in an enhanced form to data terminal equipment (DTE) connected to the DCE, the DCE including:

a receiver for receiving a modulated signal that includes at least one data packet that represents the session request and includes data indicating the source of the session request;

a demodulator coupled to the receiver for demodulating the modulated signal;

a processor coupled to the demodulator for disassembling each data packet, extracting from at least one data packet the data indicating the source of the session request and preparing an enhanced service signal that includes the session request and an identifier, based upon the data indicating the source of the session request; and a communications pathway from the processor to the DTE for transmitting the enhanced service signal.

24. The DCE of claim 23, wherein the enhance service signal is configured as a serial data stream.

25. The DCE of claim 24, wherein the communications pathway is an RS-232 interface.

26. A method of using a modem to enhance a data communication service signal that is communicated over a data communications network and through a gateway to the modem, wherein the modem is configurable to receive the service signal from the gateway and is connected to data terminal equipment (DTE), the method comprising the steps of:

receiving at the modem a session request from a request initiator, wherein the session request is transmitted via the data communications network through the gateway to the DTE;

determining whether the session request is valid; if the session request is valid, preparing the service signal from the modem to the DTE in response to the session request;

determining whether the service signal should be enhanced, and if the service signal is to be enhanced, determining which enhancement mode of a plurality of enhancement modes has been requested and enhancing the service signal by including in the service signal enhancement data derived from the session request, wherein the enhancement data is selected based upon the enhancement mode requested;

transmitting the service signal as enhanced to the DTE; and processing the service signal as enhanced at the DTE.

27. The method of claim 26, wherein the preparing step includes the step of determining the type of session request and preparing the service signal based upon the type of session request.

28. The method of claim 26, wherein the session request includes identification data that identify the source of the session request.

29. The method of claim 28, wherein one enhancement mode of the plurality of enhancement modes requires, when selected, that the enhancement data include an identifier derived from the identification data.

30. The method of claim 26, wherein the session request includes a presentation string.

31. The method of claim 30, wherein one enhancement mode of the plurality of enhancement modes requires, when selected, that the enhancement data include a message derived from the presentation string.

* * * * *

UNITED STATES PATENT AND TRADEMARK OFFICE
CERTIFICATE OF CORRECTION

PATENT NO.  : 5,657,345
DATED       : August 12, 1997
INVENTOR(S) : Mihal Lazaridis It is certified that error appears in the above-indentified patent and that said Letters Patent is hereby corrected as shown below:

Claim 20 should read as follows:

20. The method of claim 16, wherein the processing step (g) includes a step of displaying a message based upon the presentation string if the processing string is present.

Signed and Sealed this

Twenty-eighth Day of October, 1997

Attest:

BRUCE LEHMAN

Attesting Officer

Commissioner of Patents and Trademarks